Patented July 31, 1945

2,380,474

UNITED STATES PATENT OFFICE 2,380,474

CATALYSTS FOR THE ADDITION POLYMERIZATION OF UNSATURATED ORGANIC COMPOUNDS

William D. Stewart, Akron, Ohio, assignor to The B. F. Goodrich Company, New York, N. Y., a corporation of New York No Drawing. Application February 19, 1941, Serial No. 379,714

16 Claims. (Cl. 260—84.5)

This invention relates to the polymerization of unsaturated organic compounds which are capable of undergoing an addition polymerization to form high molecular weight linear polymers, more particularly to the polymerization of conjugated butadienes either alone, in mixtures with one another or with other polymerizable comonomers such as the vinyl and vinylidene compounds. The principal object of the invention is to provide a new class of catalysts or accelerators of polymerization by the use of which improved polymers may be obtained in increased yield and in a much shorter interval of time.

It is known that addition polymerizations may be accelerated or promoted by the presence of various substances among which are oxygen and oxygen yielding compounds such as hydrogen peroxide, benzoyl peroxide and per-salts. However, with the use of such known polymerization initiators, considerable difficulty is still experienced in obtaining high yields of a desirable polymer in a short interval of time. Particularly in the commercial manufacture of polymers by emulsion polymerization, the production schedule is frequently disrupted by slow reactions and long induction periods before the polymerization starts.

I have now discovered a large number of substances which have been termed redox systems because of their property of catalyzing or promoting oxidation reduction reactions, particularly those occurring in biological processes, which substances are quite effective in promoting addition polymerizations and which are vastly superior to any previously described polymerization initiators or accelerators in that the polymerization is carried out in a much shorter time, the induction period is largely eliminated, lower temperatures for the polymerization may be employed and consequently a higher molecular weight more linear polymer possessing more desirable properties is obtained.

The class of redox systems, with which the present invention is concerned, is that class which comprises an aliphatic carboxylic organic acid combined with a heavy metal compound. The term "heavy metal" as used herein is meant to include those metallic elements which have a density greater than four, an atomic weight greater than forty, and a low atomic volume (ratio of atomic weight to density) and consequently appear substantially at the minimum points above an atomic weight of forty on Lothar Meyer's curve of atomic volumes. (See any standard textbook of Inorganic Chemistry such as Ephraim "Textbook of Inorganic Chemistry," page 30, or Caven and Lander "Systematic Inorganic Chemistry" facing page 30). The term "heavy metal" includes, therefore, those metallic elements appearing in the center positions of the long periods of a periodic table arranged in short and long periods, and especially those occurring in the 6th to 12th positions of the long periods (considering the alkali metals to occupy the first position and all the rare earth metals to occupy a single position), that is, the elements occurring in group VIII of the Mendeleef Periodic Table such as iron, cobalt and nickel, those in subgroup B of groups I and II of the Mendeleef Periodic Table such as copper, silver, zinc, cadmium and mercury, and those in subgroup A of groups VI and VII of the Mendeleef Periodic Table such as chromium, manganese and molybdenum.

Among the aliphatic carboxylic acids which, when combined with a heavy metal compound, are included as redox systems in this invention are the saturated fatty acids such as formic, acetic, butyric, lauric, myristic, palmitic and stearic acids; unsaturated fatty acids containing one or more double bonds such as crotonic, tiglic, oleic, linoleic, and linolenic acids as well as cyclic unsaturated fatty acids such as hydnocarpic and chaulmoogric acids; hydroxy substituted fatty acids of either the saturated or unsaturated series such as malic, lactic, citric, glycollic, tartaric betahydroxy butyric, dihydroxy maleic, and ricinoleic as well as the various hydroxy acids derived from the oxidation of sugars such as ascorbic acid; amino substituted fatty acids such as glycine, alanine, valine, leucine, serine, lycine, aspartic acid, and glutamic acid; dicarboxylic acids such as oxalic, malonic, succinic, glutaric, sebacic, adipic, maleic, and fumaric acids and their hydroxy, amino or keto substituted derivatives; keto acids such as pyruvic, acetoacetic and levulinic acid and many others.

The class of redox systems of this invention designated as aliphatic carboxylic organic acids having a heavy metal compound combined therewith is meant to include, broadly, any of the aliphatic metals mentioned above with any of the aliphatic carboxylic acids listed above. The metal may be combined with the carboxylic acid either as a salt or in a complex compound or combinations of acids and metals which are not known to form complexes or salts may be used. In the latter event the redox system will consist of a mixture of the metal in the form of one of its simple salts together with the organic carboxylic acid or one of its simple salts. The preferred redox systems are those which are water soluble and consist of an aliphatic organic acid containing in addition to its characterizing carboxy group at least one other hydrophilic group such as amino, aldo, keto, carboxy, hydroxy and sulfonic acid groups, and also containing from 2 to 6 carbon atoms, combined with a water soluble salt of a heavy metal occurring in the 6th to 12th positions of the first long period of the periodic table such as iron, cobalt, nickel, copper and manganese. Particularly preferred in this group are the iron, cobalt and copper complexes formed with organic acids which are derived from the oxidation of sugars, i. e., the so-called "reductones" from sugars.

In the practice of this invention monomeric compounds or mixtures of monomers are polymerized by well known methods of polymerization such as by polymerization in homogeneous systems or by polymerization in emulsions in presence of small amounts of the redox systems of this invention. In the emulsion polymerization process, which is at present preferred, the monomer or monomer mixture is emulsified in a non-solvent liquid, usually water, with the acid of an emulsifying agent and polymerization is then effected by adding the heavy metal, organic acid system of this invention together, if desired, with various other substances, the nature of which will be described hereinafter, and agitating the emulsion until polymer is formed. The resulting polymerized emulsion containing polymer particles dispersed in a liquid medium greatly resembles natural rubber latex and may be coagulated in the usual manner to yield the solid polymer.

The amount of the redox systems to be used in polymerization may be varied over rather wide limits provided that an excessive amount of the redox system does not inhibit or poison the polymerization reaction. For most purposes only catalytic amounts of the redox system, say less than 2% by weight based on the weight of the monomers are preferred and in most instances the polymerization proceeds most rapidly when from .01 to 1% of the redox system is present. When the organic acid and heavy metal are added as separate compounds a mixture of about .5% of the organic acid and .1% of the heavy metal salt is preferred. When using some heavy metals, particularly copper and manganese, however, it is desirable to use even smaller concentrations of the heavy metal salt, less than 0.01% since these metals in higher concentration tend to inhibit the polymerization.

As has been mentioned hereinabove, the redox systems of this invention may be used, generally, in the polymerization of those unsaturated organic compounds which are capable of undergoing an addition polymerization to form a high molecular weight linear polymer. Included in this class of monomers are the conjugated butadienes such as butadiene, isoprene, dimethyl butadiene, chloroprene, piperylene and the like all of which contain a

group; monomer mixtures of two or more of these buta-dienes such as a mixture of butadiene and dimethyl butadiene; and monomer mixtures of one or more of these conjugated buta-dienes with one or more other compounds which also contain a

group and copolymerize with conjugated butadienes such as mixtures of butadiene with vinyl compounds including aryl olefins and substituted aryl olefins such as styrene, p-chloro styrene, p-methoxy styrene, vinyl naphthalene and the like, acrylic and methacrylic acids, esters, nitriles and amides such as acrylic acid, acrylonitrile, methacrylonitrile, methyl acrylate, methyl methacrylate, butyl acrylate, methacrylamide and the like and other vinyl compounds such as vinyl ketones, vinyl ethers, vinyl carbazole, vinyl furane and the like. Monomer mixtures of butadienes with other compounds, in addition to vinyl type compounds, which also contain a

group such as vinylidene chloride and the like may also be used. All these monomers and monomer mixtures when polymerized or copolymerized in the manner herein described form high molecular weight linear polymers. When the conjugated butadiene is the monomer or is the predominant constituent of a monomer mixture such polymers are rubbery in character and may be called synthetic rubber.

Other monomers or monomer mixtures which are capable of undergoing an addition polymerization and which may be used in the process of this invention are the above mentioned vinyl and vinylidene compounds as well as other vinyl compounds such as vinyl chloride and vinyl acetate, either alone or in mixtures with one another, all of which polymerize to yield a linear polymer of a thermoplastic resinous character.

The organic acid heavy metal redox systems of this invention may be used in the polymerization of monomers in emulsions prepared with various emulsifying agents and containing various other catalysts, initiators, promoters, accelerators or modifiers of polymerization. As emulsifying agents, partially neutralized fatty acid soaps such as 70-90% neutralized myristic or palmitic acids are particularly effective but other well known emulsifying agents including completely neutralized fatty acid soaps such as sodium oleate and sodium palmitate and hymolal sulfates or sulfonates such as sodium lauryl sulfate and sodium isobutyl naphthalene sulfonate may also be employed.

The redox systems containing an aliphatic carboxylic organic acid and a heavy metal are preferably used to accelerate polymerizations initiated with well known oxygen yielding compounds such as hydrogen peroxide, benzoyl peroxide, potassium persulfate, sodium perborate, potassium percarbonate and the like, but may also be employed with other known polymerization initiators such as diazoaminobenzene, trichloroacetic acid and carbon tetrachloride. Although the polymerization of conjugated butadienes in presence of a peroxide and a peroxide activator such as amino acids and saturated fatty acids has been disclosed in copending applications of Charles F. Fryling Serial Nos. 336,404 and 334,382, the use of a heavy metal associated with these organic acids greatly accelerates the polymerization. The redox systems of this invention may also be used advantageously in polymerizations which employ a reducing agent such as sulfur dioxide as the polymerization initiator. Moreover the redox systems disclosed herein may be used to effect polymerizations carried out in the absence of an added initiator, such polymerizations being incapable of proceeding without the redox system. They may also be employed in the polymerization of emulsions containing a polymerization modifier such as dialkyl dixanthogens, diaryl disulfides, thiuram disulfides and other sulfur containing compounds known to increase the solubility and plasticity of polymers.

Although the exact manner in which the organic acid-heavy metal redox systems accelerate polymerizations is not known with certainty, it is believed that the redox system promotes or catalyzes an oxidation reduction reaction which oxidizes or activates the monomer molecules to such an extent that they are then capable of initiating a chain reaction which produces a linear polymer. The redox system may directly catalyze the oxidation of the monomer by an oxidizing agent such as a peroxide, if such is present, or it may be auto-oxidizable, as is probably the case with complex compounds of organic acids and heavy metals, and be capable of inducing monomer oxidation or activation by an oxidation reduction involving the redox system itself, or some other mechanism may be responsible for the increase in the rate of polymerization and for the improved properties of the polymerization products. The association of small amounts of heavy metals with various aliphatic organic acids in biological systems which undergo oxidation reduction reactions is well known and many theories have been propounded for an explanation of such biological oxidoreductions. Since it is believed that the initiation of polymerization reactions is quite similar to biological oxidoreductions, particularly as regards the role of the redox catalyst, analogies of polymerization systems with biological systems have proved of great value in elucidating the action of the redox systems of this invention. It is to be understood however, that the invention is not to be limited by any proposed theory since the inclusion of the substances herein described and herein designated as redox systems in polymerization mixtures greatly accelerates the process and also improves the quality of the polymerization products.

In order to illustrate the practice of this invention and to show the accelerating effect of the redox systems of this invention upon polymerizations an emulsion containing the following ingredients is prepared:

| | Parts |
|---|---|
| Butadiene | 55 |
| Acrylonitrile | 45 |
| Hydrogen peroxide (3½ solution) | 10 |
| Emulsifying solution—(2% aqueous solution of myristic acid 85% neutralized with NaOH) | 250 |
| Polymerization modifier | 0.3 |

This emulsion is then divided into equal parts and redox systems added to the emulsions as follows:

(1) No redox systems added—control.
(2) .05% by weight (based on monomers) of ferrous ammonium sulfate
    .50% by weight (based on monomers) of succinic acid
(3) 0.50% by weight of ferrous ammonium sulfate
    0.50% by weight of levulinic acid
(4) 0.05% by weight of cobalt chloride
    0.50% by weight of levulinic acid
(5) 0.01% by weight of cuprous chloride
    0.50% by weight of glycine
(6) 0.10% by weight of cuprous chloride The emulsions are then placed in sealed glass tubes and rotated at 30° C. At various intervals the percent yield of polymer is determined. Data for the various tubes is shown in the following table:

| Tube | Percent yield after 7½ hours | Percent yield after 10½ hours | Percent yield after 12½ hours | Percent yield after 23 hours | Percent yield after 45 hours |
|---|---|---|---|---|---|
| (1) | 0 | 0 | 0 | 45 | 94 |
| (2) | 12 | 38 | 59 | 94 | |
| (3) | 52 | 86 | 93 | | |
| (4) | 46 | 85 | 95 | | |
| (5) | 18 | 52 | 66 | 94 | |
| (6) | 0 | 0 | 0 | 0 | 0 |

It may be seen that with no redox system added, the polymerization has not started after 12½ hours and is not complete at 45 hours, while with the redox systems of this invention present polymerization has started in 7½ hours and is substantially complete in 23 hours. With levulinic acid and a cobalt or iron salt, polymerization is substantially complete after 12½ hours. With cuprous chloride alone there is no polymerization even after 45 hours, but with a cuprous chloride, glycine redox system polymerization is substantially complete in 23 hours.

In another embodiment of the invention a monomer mixture containing 2.5 g. of styrene and 7.5 g. of butadiene is emulsified with 25 cc. of a 2% aqueous sodium lauryl sulfate solution, and in presence of 0.035 g. of hydrogen peroxide, .03 g. of a polymerization modifier and .20 g. of sodium pyrophosphate. This emulsion requires 110 hours at 30° C. to yield 82% of a rubber-like copolymer while a similar emulsion also containing 0.1 g. of iron succinate requires only 63 hours at 30° C. to yield 99% of a rubber like copolymer which is more plastic and more soluble in acetone.

Other embodiments of the invention in which various other organic acids are used with various heavy metals and with various monomer mixtures, catalysts and emulsifying agents also show that the polymerization velocity is increased by the practice of this invention. For example, it is possible to polymerize a mixture of butadiene and a vinyl compound using a water soluble salt of a heavy metal such as iron or cobalt and ascorbic acid in a very short time without any other catalyst being present. The same is true when using other acidic "reductones" from sugars such as acetoacetic acid, oxaloacetic, pyruvic, glyoxalic and other acids.

In the practice of the invention it is sometimes desirable to add various substances other than those mentioned above to the polymerization recipe. For example, when employing redox systems which are very effective in biological processes such as the ascorbic acid-heavy metal system it may be desirable to add colloids which are present in biological systems as "carriers" for the redox system such as proteins, peptides, polypeptides, or other colloidal material. It may also be desirable to add materials which influence the quality of the finished polymer such as plasticizing or stabilizing agents for the polymer.

The practice of this invention also allows polymerization to proceed rapidly under conditions where polymerization would ordinarily be impossible, because the great accelerating effect of the redox system more than counteracts the inhibiting effect of other substances which would prevent the polymerization. Many such inhibiting substances are difficult to exclude from the polymerization batch because they are present as impurities in the monomers or in other essential materials.

Although various embodiments of the invention have been herein disclosed, it is not intended that the invention be limited solely thereto for it will be obvious to those skilled in the art that many modifications and variations are within the spirit and scope of the invention as defined by the appended claims.

I claim:

1. The method which comprises subjecting a polymerizable material consisting of at least one unsaturated organic compound which contains a

group and which undergoes in aqueous emulsion an addition polymerization to form a high molecular weight linear polymer, to polymerization in aqueous emulsion in the presence of a catalyst comprising a water-soluble heavy metal salt combined with an aliphatic keto substituted carboxylic acid, the total concentration of the heavy metal compound and the carboxylic acid being less than 2% by weight based on the material polymerized, and the concentration of the heavy metal compound being such that the polymerization proceeds more rapidly than in the absence of the heavy metal compound.

2. The method of claim 1 in which the material subjected to polymerization is a polymerizable conjugated butadiene.

3. The method of claim 1 in which the material subjected to polymerization is a mixture of a polymerizable conjugated butadiene and at least one other compound which contains a

group and is copolymerizable therewith in aqueous emulsion.

4. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising an aliphatic keto-substituted carboxylic acid containing from 2 to 6 carbon atoms combined with a water soluble heavy metal salt, the total concentration of the carboxylic acid and the heavy metal salt being less than 2% by weight based on the material polymerized and the concentration of the heavy metal salt being such that the polymerization proceeds more rapidly than in the absence of the heavy metal salt.

5. The method of claim 4 in which the heavy metal salt is a salt of a heavy metal occurring in the 6th to 12th positions of the first long period of the periodic table.

6. The method of claim 4 in which the heavy metal salt is a salt of a heavy metal occurring in group VIII and the first long period of the periodic table.

7. The method of claim 4 in which the material polymerized is a mixture of butadiene-1,3 and acrylonitrile and the heavy metal salt is a salt of a heavy metal occurring in the 6th to 12th position of the first long period of the periodic table.

8. The method of claim 4 in which the material polymerized is a mixture of butadiene-1,3 and styrene and the heavy metal salt is a salt of a heavy metal occurring in the 6th to 12th positions of the first long period of the periodic table.

9. The method of claim 4 in which the catalyst comprises levulinic acid and a water soluble cobalt salt.

10. The method of claim 4 in which the material polymerized is a mixture of butadiene-1,3 and acrylonitrile and the catalyst comprises levulinic acid and a water soluble cobalt salt.

11. The method of claim 4 in which the material polymerized is a mixture of butadiene-1,3 and acrylonitrile and the catalyst comprises levulinic acid and a water soluble iron salt.

12. The method of claim 4 in which the material polymerized is a mixture of butadiene-1,3 and styrene and the catalyst comprises levulinic acid and a water soluble iron salt.

13. The method of claim 4 further characterized in that hydrogen peroxide is present.

14. The method which comprises subjecting a mixture of a polymerizable conjugated butadiene and at least one other compound which contains a

group and is copolymerizable therewith in aqueous emulsion, to polymerization in aqueous emulsion in the presence of a catalyst comprising a water-soluble complex compound of a heavy metal and an aliphatic keto substituted carboxylic acid, the concentration of the complex compound being less than 2% by weight based on the material polymerized and such that the polymerization proceeds more rapidly than in the absence of the complex compound.

15. The method of claim 14 in which the heavy metal is a heavy metal occurring in the 6th to 12th positions of the first long period of the periodic table.

16. The method of claim 14 in which the heavy metal is a heavy metal occurring in group VIII and the first long period of the periodic table.

WILLIAM D. STEWART.